(12) United States Patent
Alecu

(10) Patent No.: US 11,549,440 B2
(45) Date of Patent: Jan. 10, 2023

(54) PRESSURE REGULATOR AND BLEED AIR SYSTEM FOR AIRCRAFT ENGINE

(71) Applicant: PRATT & WHITNEY CANADA CORP., Longueuil (CA)

(72) Inventor: Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/839,341

(22) Filed: Apr. 3, 2020

(65) Prior Publication Data

US 2021/0310414 A1  Oct. 7, 2021

(51) Int. Cl.
*F02C 6/08* (2006.01)
*F02C 7/24* (2006.01)
*F16K 31/126* (2006.01)

(52) U.S. Cl.
CPC .............. *F02C 7/24* (2013.01); *F02C 6/08* (2013.01); *F16K 31/1262* (2013.01)

(58) Field of Classification Search
CPC ...... F02C 6/08; F04D 27/0215; F16K 31/126; F16K 31/1262
USPC ....................................................... 251/61.5
See application file for complete search history.

(56) References Cited

U.S. PATENT DOCUMENTS

| | | | |
|---|---|---|---|
| 1,512,243 A | 10/1924 | Shrode | |
| 1,712,657 A * | 5/1929 | Frankenberg | F25B 49/027 92/94 |
| 2,342,659 A | 2/1944 | Grove et al. | |
| 2,380,459 A | 7/1945 | Fritz | |
| 2,528,472 A * | 10/1950 | Hess | B21J 9/16 60/470 |
| 2,610,819 A | 9/1952 | Sutton | |
| 2,615,287 A | 10/1952 | Senesky | |
| 2,650,455 A | 9/1953 | Jacobsson et al. | |
| 2,672,890 A * | 3/1954 | Bales | F16K 31/126 92/95 |
| 2,707,966 A * | 5/1955 | Taplin | G05D 16/0663 137/505.34 |
| 2,854,025 A | 9/1958 | Charles | |

(Continued)

FOREIGN PATENT DOCUMENTS

DE     102018206331 A1 * 10/2019

*Primary Examiner* — Gerald L Sung
*Assistant Examiner* — Marc J Amar
(74) *Attorney, Agent, or Firm* — Norton Rose Fulbright Canada LLP

(57) ABSTRACT

Pressure regulators together with associated methods and systems are provided. An embodiment of a pressure regulator includes a chamber having an inlet port for receiving a fluid and an outlet port for delivering the fluid at a regulated pressure. The pressure regulator includes a diaphragm defining at least part of the chamber, and the diaphragm defining a first orifice therethrough. The pressure regulator includes a spring configured to interact with the diaphragm. The pressure regulator includes an interface operatively disposed between the spring and the diaphragm. The interface includes a contact surface for contacting the diaphragm, and the contact surface is convex toward the diaphragm. The interface defines a second orifice therethrough that is in fluid communication with the first orifice in the diaphragm. The first and second orifices define a relief port for venting the chamber to an ambient environment external to the chamber.

13 Claims, 11 Drawing Sheets

(56) References Cited

U.S. PATENT DOCUMENTS

| | | | |
|---|---|---|---|
| 2,858,840 A | | 11/1958 | Wright |
| 3,439,580 A | * | 4/1969 | Riester ................. F15B 15/261 |
| | | | 91/45 |
| 3,468,511 A | | 9/1969 | Haskins |
| 3,545,471 A | * | 12/1970 | Taplin ................. G05D 16/0641 |
| | | | 137/116.5 |
| 3,662,779 A | * | 5/1972 | Weber ................. G05D 16/0641 |
| | | | 137/489 |
| 4,226,257 A | | 10/1980 | Trinkwalder |
| 4,450,858 A | | 5/1984 | Acomb |
| 4,506,594 A | * | 3/1985 | Rowland ................. B64D 13/04 |
| | | | 454/74 |
| 4,510,846 A | | 4/1985 | Gazzera |
| 4,612,826 A | | 9/1986 | Greene |
| 4,693,267 A | | 9/1987 | Patterson |
| 4,719,940 A | | 1/1988 | Beavers |
| 4,744,387 A | | 5/1988 | Otteman |
| 5,033,505 A | | 7/1991 | Eidsmore |
| 5,279,325 A | * | 1/1994 | Kaspers ............. F16K 31/1262 |
| | | | 137/270 |
| 5,383,646 A | | 1/1995 | Weingarten |
| 6,758,239 B2 | | 7/2004 | Gregoire |
| 2005/0189506 A1 | | 9/2005 | Lee |
| 2013/0150779 A1 | * | 6/2013 | Field ................... A61F 9/00781 |
| | | | 604/9 |
| 2017/0157565 A1 | * | 6/2017 | Chu ....................... B01D 63/08 |

* cited by examiner

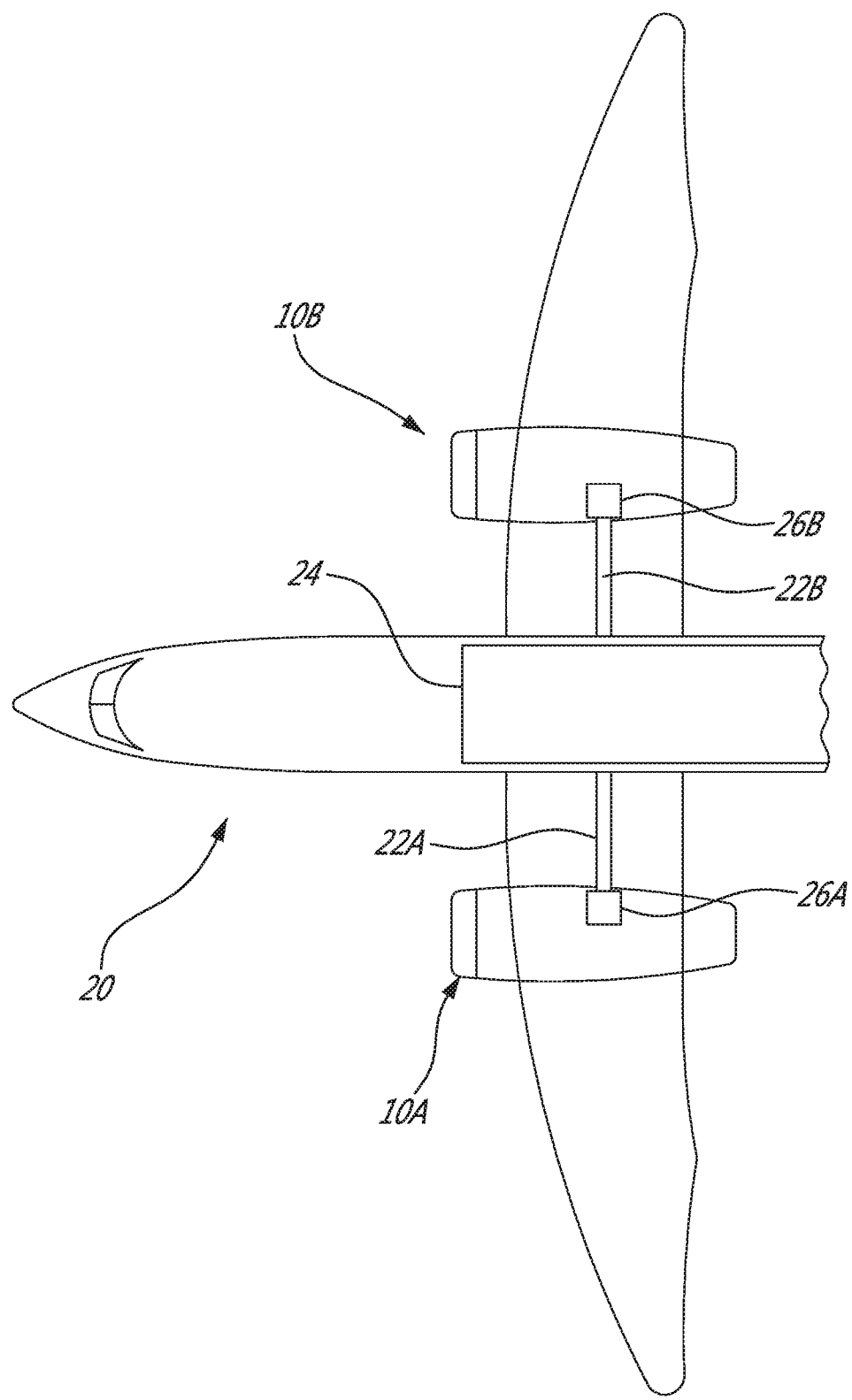

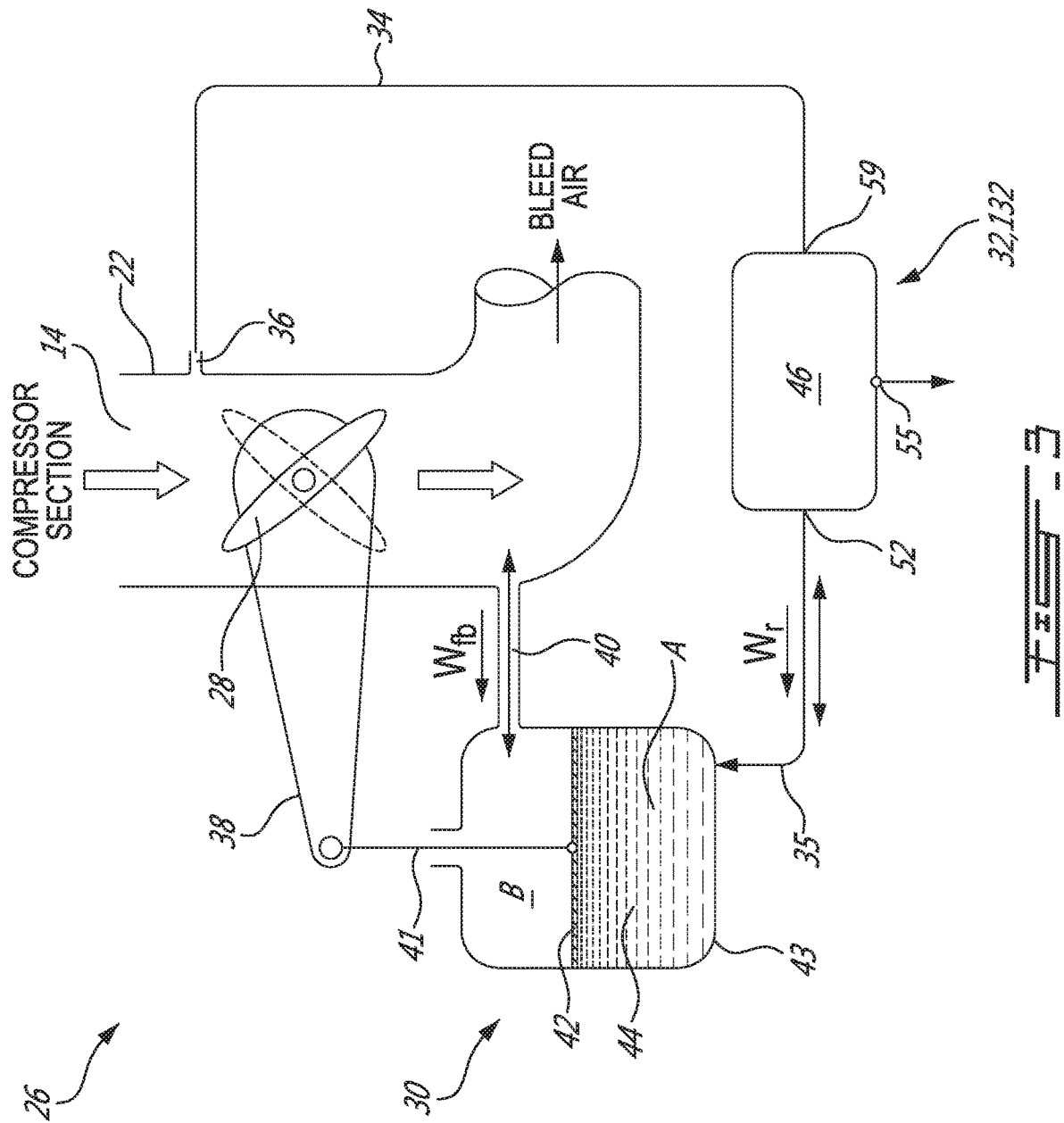

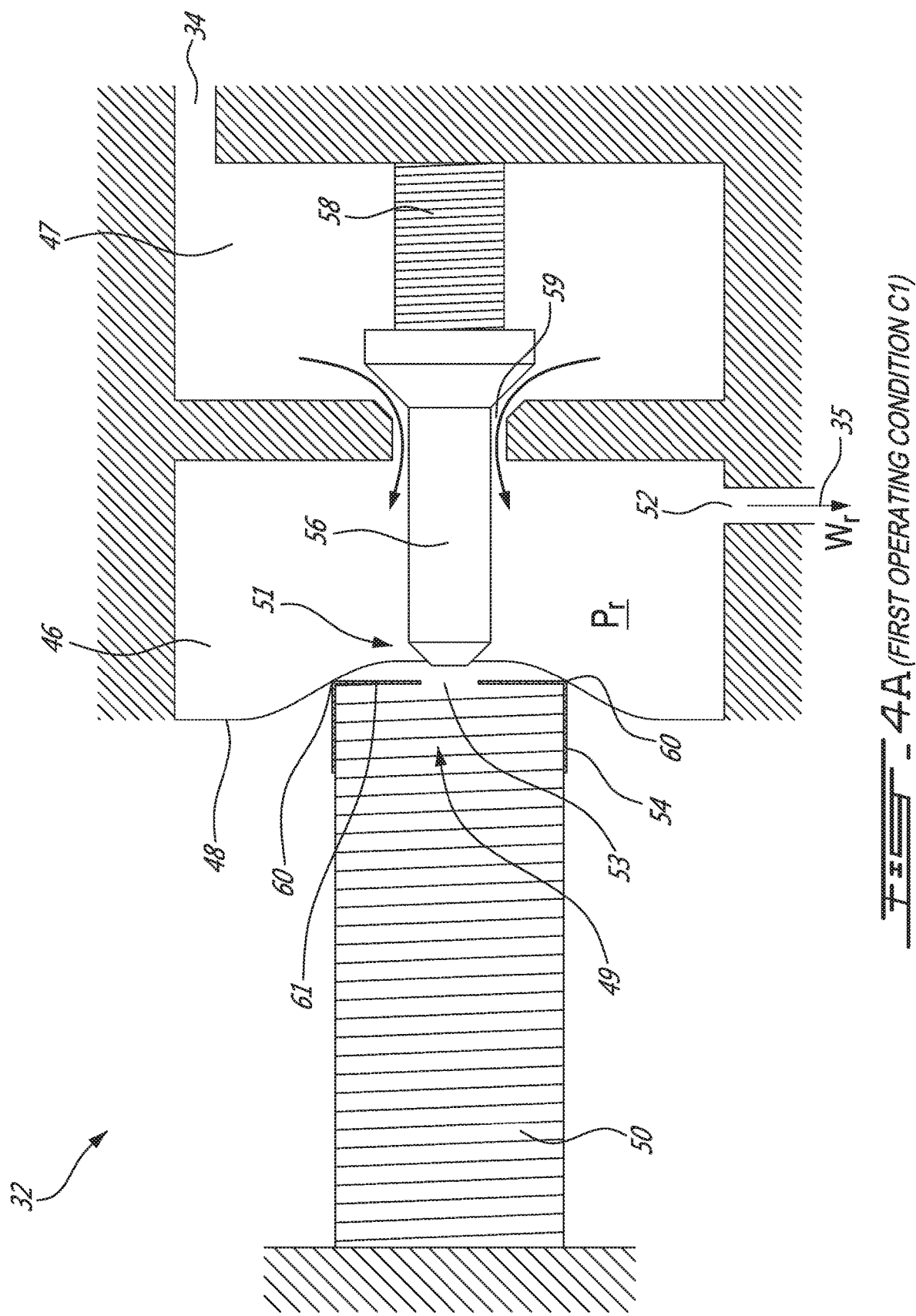
FIG. 4A (FIRST OPERATING CONDITION C1)

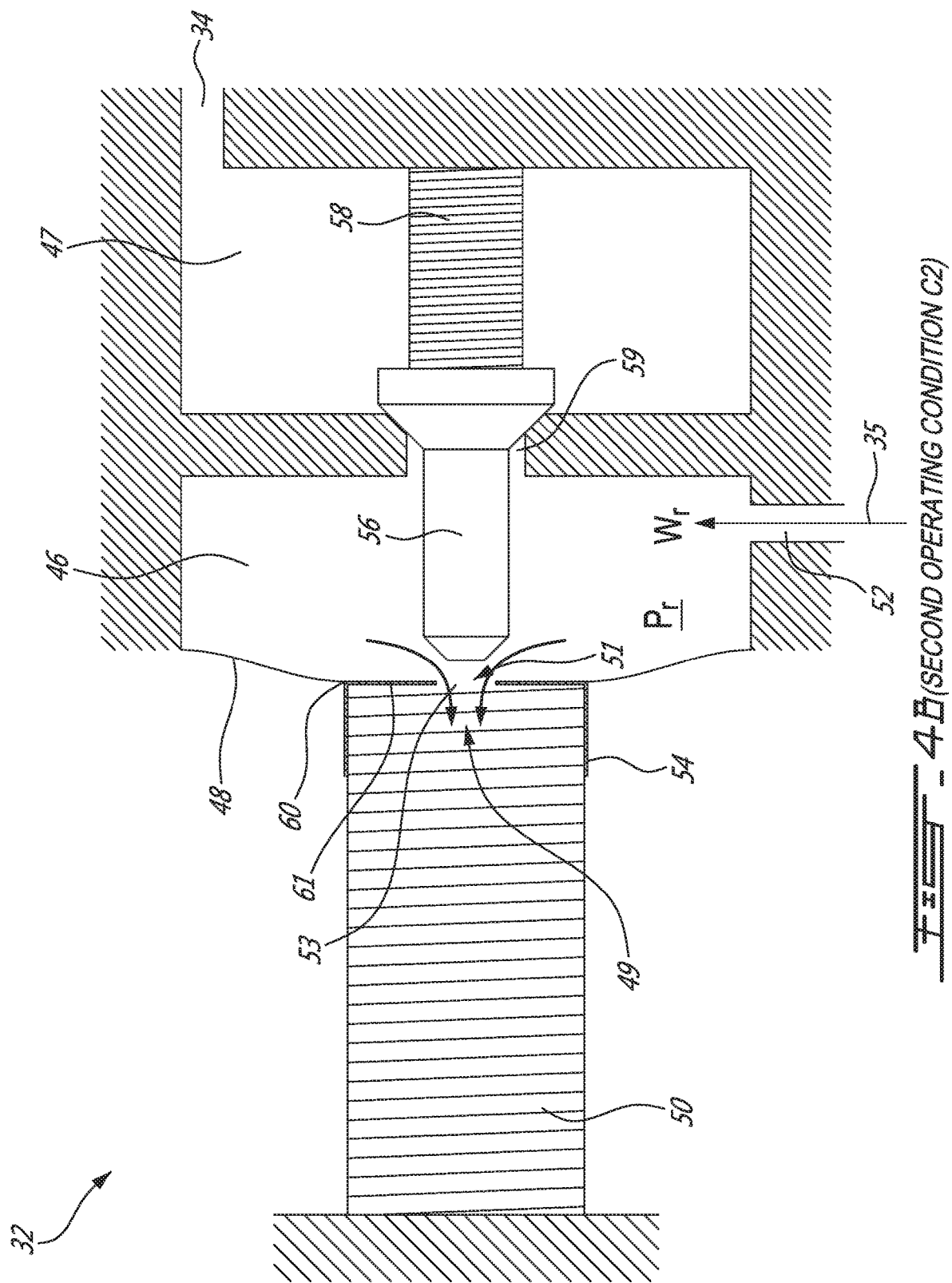

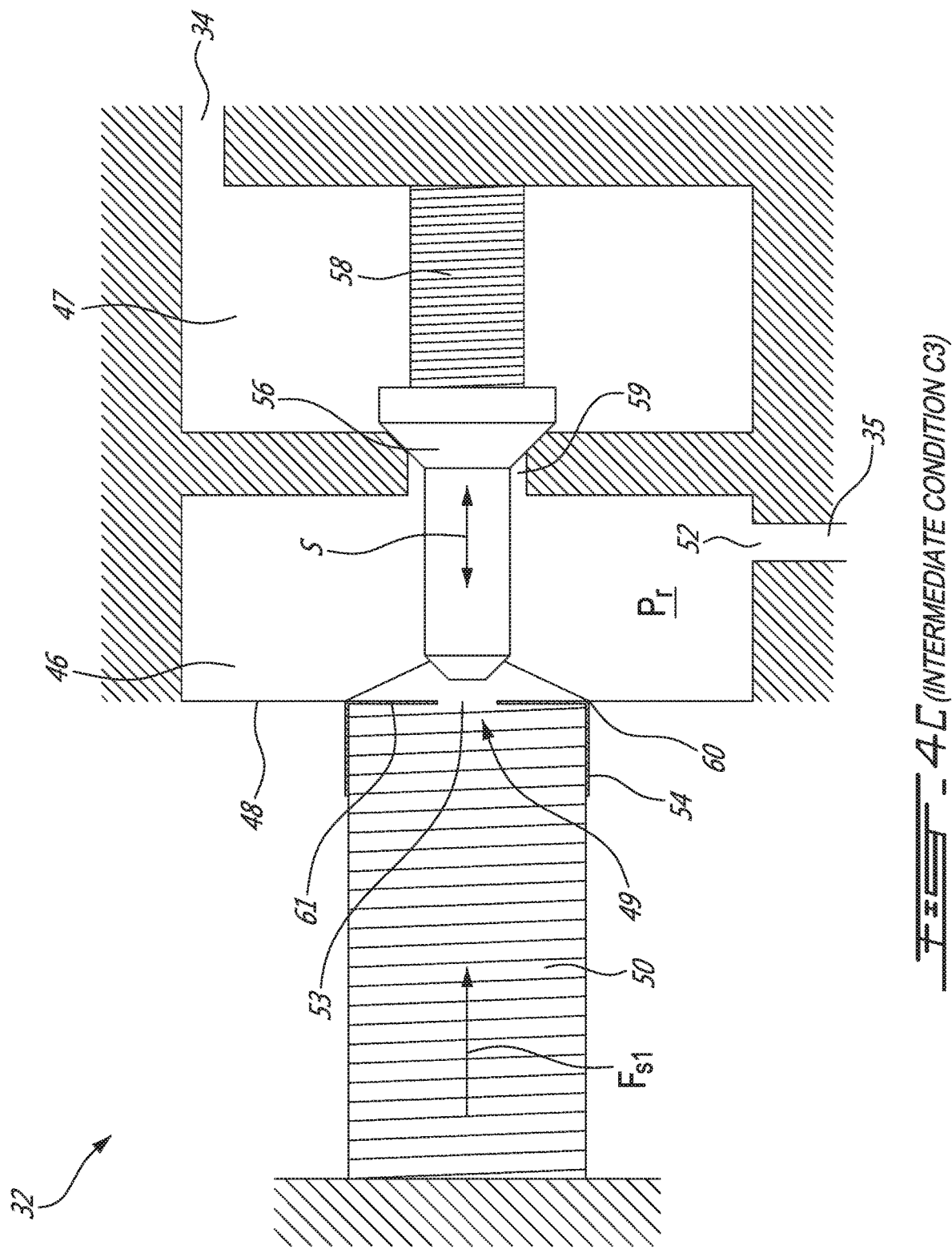

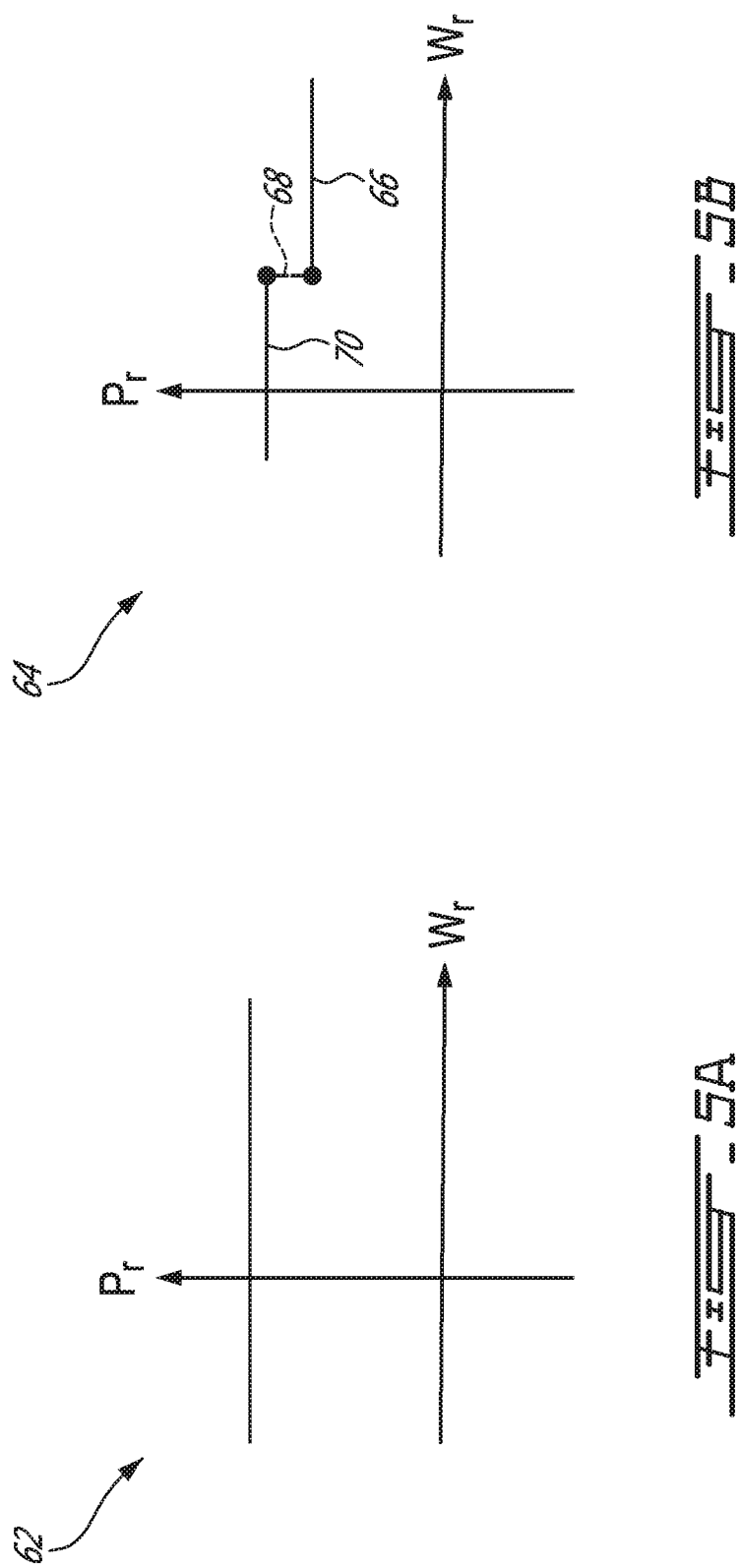

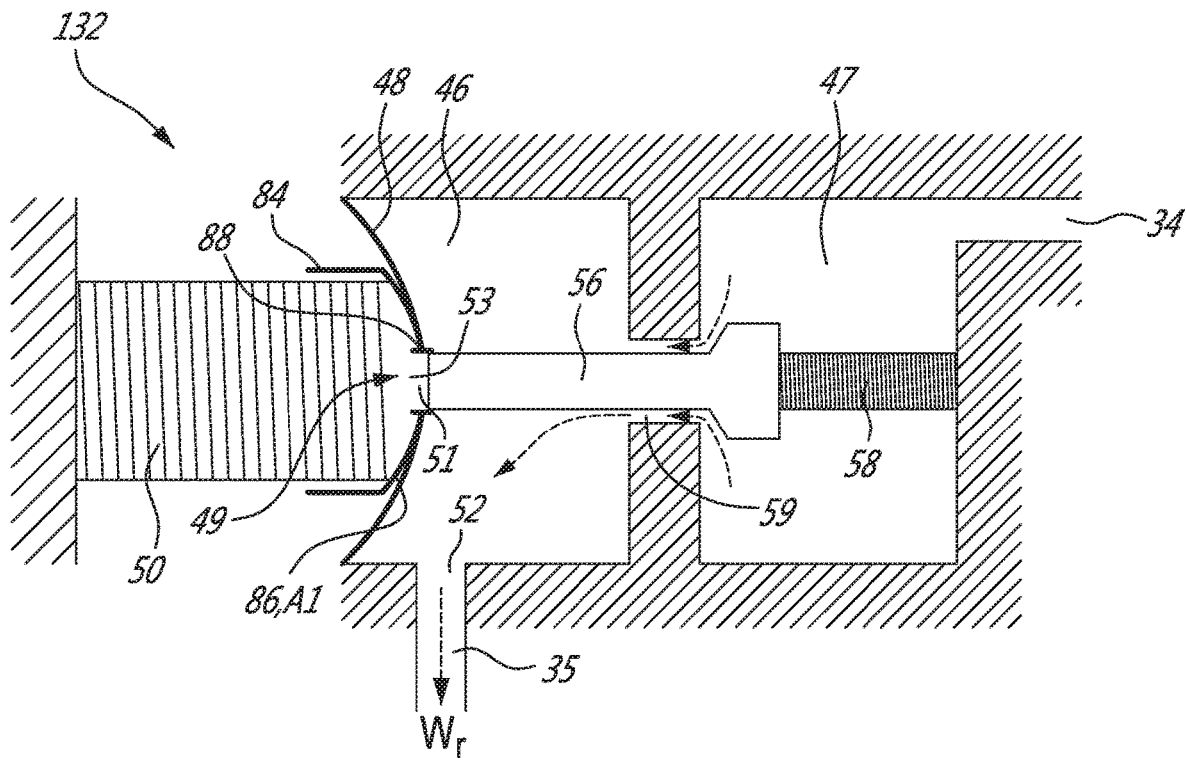
FIG. 8A (FIRST OPERATING CONDITION C1)
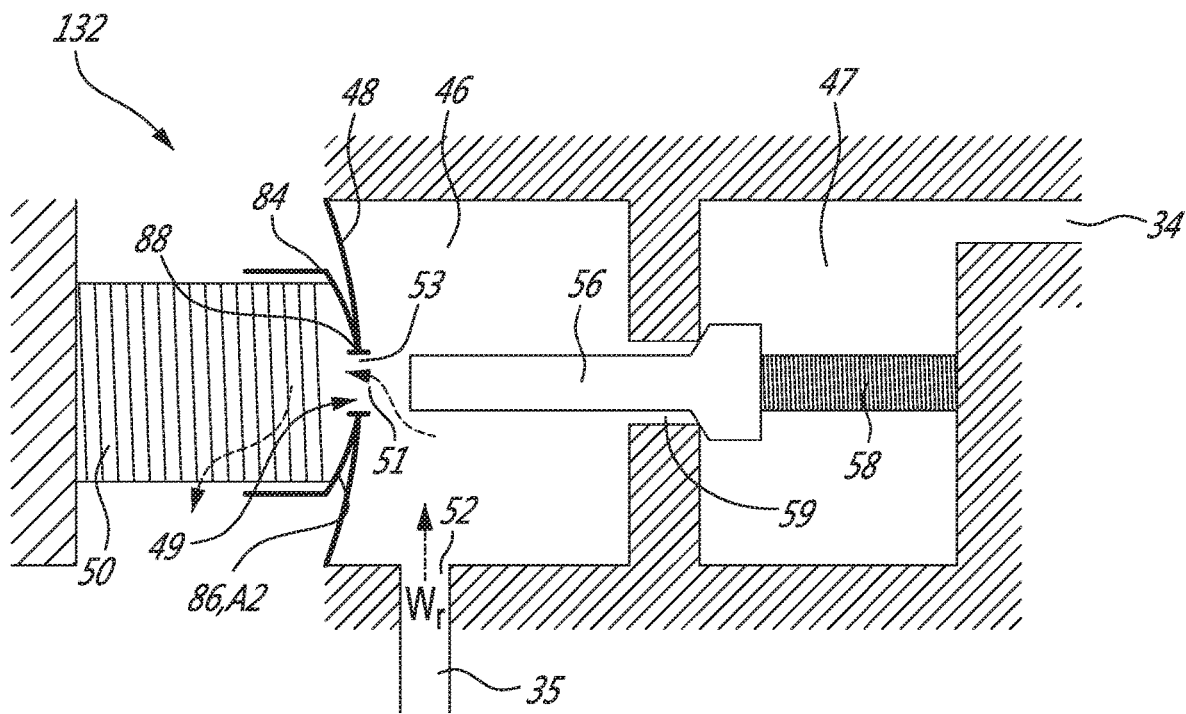
FIG. 8B (SECOND OPERATING CONDITION C2)

In a first operating condition of the pressure regulator:
- delivering delivery fluid from the chamber of the pressure regulator via an outlet port; and
- engaging a contact surface of the interface with the diaphragm over a first area of a first size.

In a second operating condition of the pressure regulator:
- receiving return fluid into the chamber via the outlet port;
- venting the return fluid from the chamber to an ambient environment external to the chamber via a relief port; and
- engaging the contact surface of the interface with the diaphragm over a second area of a second size smaller than the first size.

FIG. 9

PRESSURE REGULATOR AND BLEED AIR SYSTEM FOR AIRCRAFT ENGINE

TECHNICAL FIELD

The disclosure relates generally to pressure regulators, and more particularly to pressure regulators for controlling bleed air flow in an aircraft engine.

BACKGROUND

Bleed air is compressed air taken from a compressor section of an aircraft engine (e.g., gas turbine engine) upstream of the combustor of the aircraft engine. The bleed air can be utilized for various functions associated with an aircraft including internal cooling of the engine, cross-starting another engine, anti-icing, cabin pressurization, air conditioning and/or other pneumatic loads of the aircraft. A bleed air system of an aircraft engine can include a valve that is used to control the amount of bleed air taken from the compressor section. In some operating conditions, the operation of the valve can be a source of acoustic noise of the aircraft engine. Improvement is desirable.

SUMMARY

In one aspect, the disclosure describes a pressure regulator comprising:
  a chamber having:
    an inlet port for receiving a fluid;
    an outlet port for delivering the fluid;
    a relief port for venting an interior of the chamber to an ambient environment external to the chamber; and
    a diaphragm defining at least part of the chamber, the diaphragm having a first orifice therethrough;
  a spring configured to interact with the diaphragm;
  an interface operatively disposed between the spring and the diaphragm, the interface including a contact surface for contacting the diaphragm, the contact surface being convex toward the diaphragm, the interface defining a second orifice therethrough that is in fluid communication with the first orifice in the diaphragm, the first and second orifices defining the relief port; and
  a valve member operatively coupled to the spring and configured to:
    regulate a flow of the fluid through the inlet port; and
    regulate a flow of the fluid through the relief port.

In another aspect, the disclosure describes a system for controlling bleed air flow in an aircraft engine. The system comprises:
  a bleed air duct for receiving bleed air from a compressor section of the engine;
  a bleed air valve configured to control a flow of the bleed air through the bleed air duct;
  a pressure regulator including:
    a chamber having:
      an inlet port for receiving a portion of the bleed air;
      an outlet port for delivering the portion of the bleed air;
      a relief port for venting an interior of the chamber to an ambient environment external to the chamber; and
      a diaphragm defining at least part of the chamber, the diaphragm having a first orifice therethrough partially defining the relief port;
    a spring operatively engaged with the diaphragm;
    an interface operatively disposed between the spring and the diaphragm, the interface including a contact surface contacting the diaphragm, the contact surface being convex toward the diaphragm, the interface defining a second orifice therethrough that is in fluid communication with the first orifice in the diaphragm, the first and second orifices defining the relief port; and
    a valve member operatively coupled to the spring and configured to:
      regulate a flow of the portion of the bleed air through the inlet port; and
      regulate a flow of the portion of the bleed air through the relief port; and
  an actuator operatively coupled to the bleed air valve for controlling the bleed air valve, the actuator actuatable based on the fluid delivered at the outlet port.

In a further aspect, the disclosure describes a method for operating a pressure regulator including a diaphragm partially defining a chamber and a spring engaged with the diaphragm via an interface. The method comprises:
  in a first operating condition of the pressure regulator:
    delivering delivery fluid from the chamber of the pressure regulator via an outlet port; and
    engaging a contact surface of the interface with the diaphragm over a first area of a first size;
  in a second operating condition of the pressure regulator:
    receiving return fluid into the chamber via the outlet port;
    venting the return fluid from the chamber to an ambient environment external to the chamber via a relief port; and
    engaging the contact surface of the interface with the diaphragm over a second area of a second size smaller than the first size.

Further details of these and other aspects of the subject matter of this application will be apparent from the detailed description included below and the drawings.

DESCRIPTION OF THE DRAWINGS

Reference is now made to the accompanying drawings, in which:

FIG. 2 is a schematic partial top plan view of an exemplary aircraft having one or more gas turbine engines of FIG. 1;

FIG. 3 is a schematic view of an exemplary system for controlling bleed air;

FIGS. 4A-4C are schematic cross-sectional views of a first pressure regulator of the system of FIG. 3 at a first operating condition, a second operating condition and an intermediate condition, respectively;

FIG. 5A is a two dimensional graph showing the regulated pressure provided by an ideal pressure regulator as a function of flow rate;

FIG. 5B is a two dimensional graph showing an exemplary regulated pressure provided by the first pressure regulator as a function of flow rate;

FIGS. 8A and 8B are schematic cross-sectional views of a second pressure regulator of the system of FIG. 3 at first and second operating conditions respectively; and FIG. 9 is a flowchart of an exemplary method for operating a pressure regulator.

DETAILED DESCRIPTION

The following description discloses pressure regulators, bleed air systems of aircraft engines, and associated methods. In some embodiments, a pressure regulator as described here may reduce or substantially avoid sudden (e.g., step) changes in pressure of fluid delivered by the pressure regulator. In some embodiments, the pressure regulator may be useful in controlling a bleed air valve in a manner that generates less acoustic noise. In some embodiments, the pressure regulator may be configured to extend the life of a diaphragm of the pressure regulator and require less frequent replacement of such diaphragm.

Although terms such as "maximize", "minimize" and "optimize" may be used in the present disclosure, it should be understood that such term may be used to refer to improvements, tuning and refinements which may not be strictly limited to maximal, minimal or optimal.

The term "connected" or "coupled" may include both direct coupling (in which two elements that are coupled to each other contact each other) and indirect coupling (in which at least one additional element is located between the two elements).

Aspects of various embodiments are described through reference to the drawings.

Figure 1:
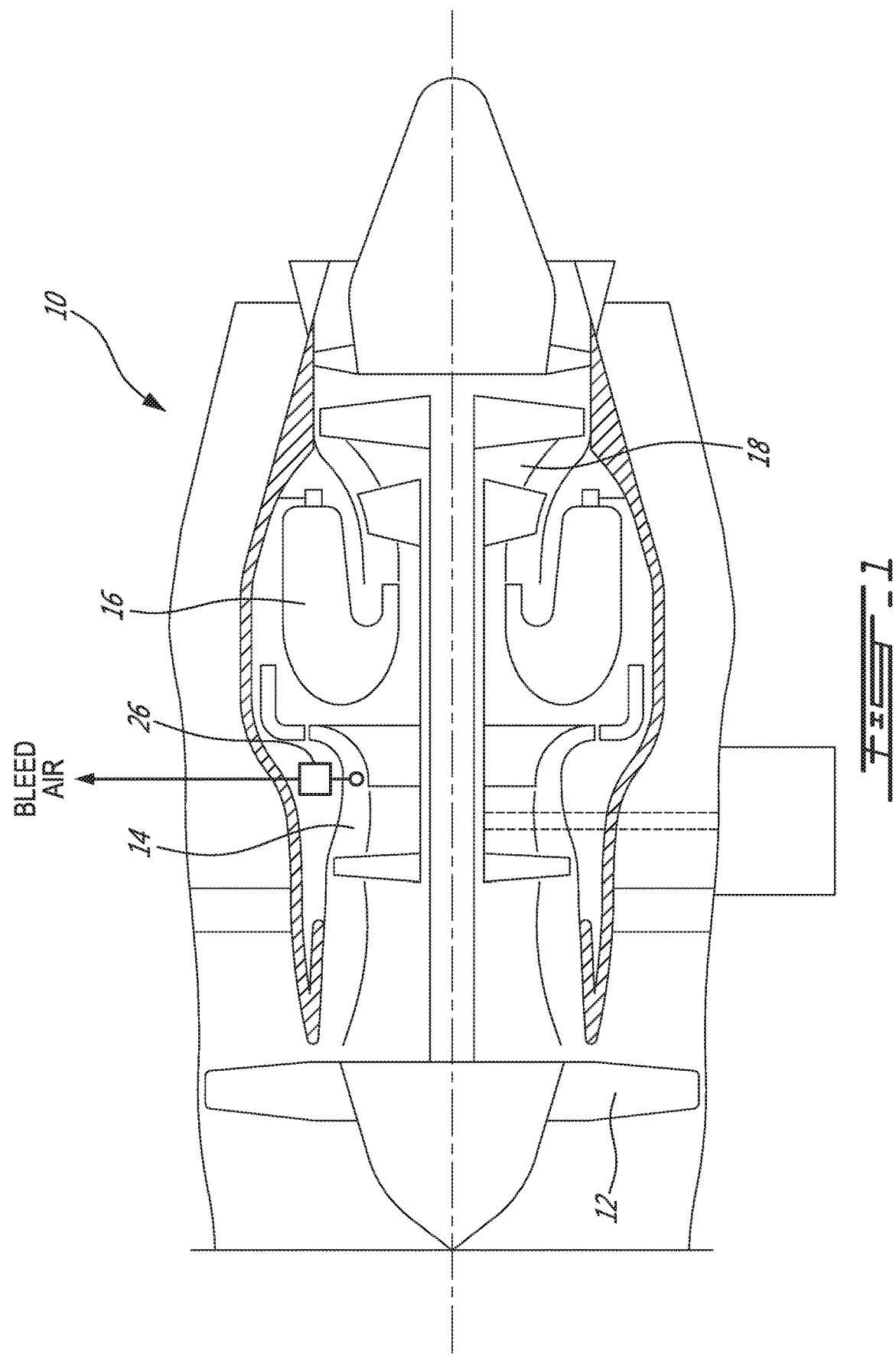
FIG. 1 is a schematic cross-sectional view of a gas turbine engine including a system for controlling bleed air as described herein.

FIG. 1 illustrates an exemplary aircraft engine 10, which may be a gas turbine engine of a type preferably provided for use in subsonic flight, generally comprising in serial flow communication a fan assembly 12 through which ambient air is propelled, compressor section 14 for pressurizing the air, a combustor 16 in which the compressed air is mixed with fuel and ignited for generating an annular stream of hot combustion gases, and a turbine section 18 for extracting energy from the combustion gases. Aircraft engine 10 may include pneumatic system 26 for controlling bleed air taken from compressor section 14 of aircraft engine 10. FIG. 1 illustrates a turbofan engine but it is understood that system 26 may also be incorporated into other types of engines including engines of the turboprop and turboshaft type. It is also understood that system 26 may be incorporated into aircraft and ground-based gas turbine engine applications.

FIG. 2 is a top plan view of an exemplary aircraft 20 including two aircraft engines 10A, 10B, each including system 26A, 26B (shown schematically) used for controlling bleed air flow from the respective aircraft engine 10A, 10B. As depicted, bleed air may be used for a number of reasons, including pressurizing cabin 24 of aircraft 20. Accordingly, the bleed air may be directed to aircraft cabin 24 via bleed air ducts 22A, 22B to provide pressurized air to the occupants of aircraft cabin 24. A delivery pressure and/or flow rate of the bleed air may be controlled using system 26.

FIG. 3 shows a schematic view of an exemplary embodiment of system 26. System 26 may include main bleed air duct 22, bleed air valve 28, first pressure regulator 32 (also shown in FIGS. 4A-4C) or second pressure regulator 132 (also shown in FIGS. 8A and 8B), and actuator 30. As depicted, bleed air valve 28 may be disposed within main bleed air duct 22. In some embodiments, bleed air valve 28 may be a butterfly-type valve but it is understood that other types of valves may also be suitable. Actuator 30 may be operatively coupled to bleed air valve 28 to adjust the position of bleed air valve 28 and thereby control the flow of bleed air through main bleed air duct 22.

In some embodiments, actuator 30 may require pressure feedback in order to adjust the position of bleed air valve 28 and thereby control the flow of bleed air through main bleed air duct 22. Actuator 30 may be a servo pneumatic actuator. Actuator 30 may include cylinder 43 housing piston 42. Actuator 30 may be coupled to bleed air valve 28 via lever 38. Lever 38 may be coupled to connecting rod 41 at a first end thereof and may be coupled to bleed air valve 28 at a second end thereof. A position of lever 38 may be adjusted based on a movement of connecting rod 41. A positional adjustment of lever 38 may cause a positional adjustment of bleed air valve 28. Bleed air valve 28 may be adjusted to be in a partially open, fully open or closed position. Accordingly, bleed air valve 28 may be positionable at intermediate positions between the closed and fully open positions.

A position of piston 42 and connecting rod 41 may be adjusted based on a difference in pressure between a first side of piston 42 (e.g., chamber A) and a second side of piston (e.g., chamber B). Actuator 30 may also include bias spring 44. Bias spring 44 may bias piston 42 toward chamber B (e.g., upward position) corresponding to an open position of bleed air valve 28. Movement of piston 42 toward chamber B may occur when a force generated on piston 42 by the pressure in chamber B is less than an opposing force generated on piston 42 by the pressure in chamber A and the bias spring 44. Movement of piston 42 toward chamber A may occur when the force generated on piston 42 by the pressure in chamber B is greater than the opposing force generated on piston 42 by the pressure in chamber A and the bias spring 44. It is understood that various embodiments of actuator 30 may be implemented using compression and/or tension springs and the use of springs in chamber A and/or in chamber B.

First pressure regulator 32 may include regulator chamber 46 having inlet port 59 for receiving fluid and outlet port 52 for delivering the fluid at a regulated pressure. First pressure regulator 32 may include relief port 49 for venting an interior of regulator chamber 46 to an ambient environment external to regulator chamber 46. In the context of first pressure regulator 32 being used in bleed air system 26, the fluid may be a portion of the bleed air delivered from main bleed air duct 22 to inlet port 59 of pressure regulator 32 using inlet duct 34. Inlet duct 34 may be in fluid communication with main bleed air duct 22 at junction 36. As depicted, junction 36 may be located upstream from bleed air valve 28. System 26 may also include outlet duct 35 for delivering fluid received via outlet port 52 of first pressure regulator 32.

Fluid may be delivered from first pressure regulator 32 to actuator 30 using outlet duct 35. The fluid may be delivered from first pressure regulator 32 to chamber A of actuator 30. Actuator 30 may be in fluid communication with outlet duct 35 and regulator chamber 46 of first pressure regulator 32. As depicted, chamber A of actuator 30 may be in fluid communication with outlet duct 35 and regulator chamber 46 of first pressure regulator 32. Actuator 30 may also be in fluid communication with fluid downstream of bleed air valve 28. As depicted, fluid downstream of bleed air valve 28 may be in fluid communication with chamber B of actuator 30 via feedback duct 40. Actuator 30 may be actuatable at least partially based on the fluid delivered at outlet port 52. In this embodiment, actuator 30 may be actuatable based on a pressure of fluid delivered at outlet port 52 and a pressure of fluid downstream of bleed air valve 28.

First pressure regulator 32 may be adjustable to maintain a desired pressure downstream of bleed air valve 28. First pressure regulator 32 may provide fluid at a regulated pressure to chamber A in order to maintain a desired pressure downstream of bleed air valve 28.

In some situations, when a pressure downstream of bleed air valve 28 (i.e. chamber B) is greater than the regulated pressure (i.e. chamber A), piston 42 and connecting rod 41 may be pushed toward chamber A (e.g., downwards) causing bleed air valve 28 to be closed and a pressure in chamber A to be increased. A pressure in outlet duct 35 and regulator chamber 46 may also be increased since chamber A of actuator 30 is in fluid communication with outlet duct 35 and regulator chamber 46. First pressure regulator 32 may be used to restore the pressure within chamber A, outlet duct 35 and regulator chamber 46 by venting some of the pressurized fluid into the ambient environment.

In some situations, when a pressure downstream from bleed air valve 28 (i.e. chamber B) is lower than the regulated pressure (i.e. chamber A), piston 42 and connecting rod 41 may be pushed toward chamber B (e.g., upwards) causing bleed air valve 28 to be at least partially opened. Opening bleed air valve 28 may cause increase bleed air flow through main bleed air duct 22 and increase pressure downstream of bleed air valve 28.

In some embodiments, bleed air valve 28 may be used to control a flow of bleed air fed to aircraft cabin 24 of aircraft 20. First pressure regulator 32 may be used for regulating a pressure of bleed air fed to aircraft cabin 24. Main bleed air duct 22 may be configured to receive bleed air from compressor section 14 of engine 10 and feed the bleed air to aircraft cabin 24. The bleed air delivered to first pressure regulator 32 from main bleed air duct 22 may be a portion of the bleed air taken from compressor section 14. However, it should be understood that system 26 may be used for other applications and is not limited to regulating bleed air taken from compressor section 14 of engine 10.

FIGS. 4A-4C show schematic cross-sectional views of an exemplary first pressure regulator 32 that may form part of system 26 and that may have a configuration that causes an acoustic noise in system 26. First pressure regulator 32 may be a single stage pressure regulator. FIGS. 4A-4C show first pressure regulator 32 in a first operating condition C1, a second operating condition C2 and an intermediate condition between first operating condition C1 and second operating condition C2, respectively. First pressure regulator 32 may include regulator chamber 46, inlet chamber 47 in fluid communication with inlet duct 34, diaphragm 48, load spring 50, interface 54 and valve member 56.

Diagraph 48 may define at least part of regulator chamber 46. As depicted, diaphragm 48 may define part (e.g., a wall) of regulator chamber 46. First orifice 51 may be defined centrally through diaphragm 48. Diaphragm 48 may be elastically deformable at least partially based on a pressure within regulator chamber 46. Diaphragm 48 may be made of a metallic material such as steel. In some embodiments, diaphragm 48 may be made of a non-metallic material.

Load spring 50 may be configured to interact with diaphragm 48. Load spring 50 may be configured to interact with an exterior side of diaphragm 48 opposite of regulator chamber 46. Force $F_{s1}$ (see FIG. 4C) generated by load spring 50 may be exerted on diaphragm 48. In some embodiments, force $F_{s1}$ exerted on diaphragm 48 may be related to a desired regulated fluid delivery pressure at outlet port 52. A stiffness and/or pre-load of load spring 50 may be chosen or adjusted to provide the desired regulated fluid pressure at outlet port 52.

Interface 54 may be operatively disposed between load spring 50 and diaphragm 48. Interface 54 may serve as an intermediate between load spring 50 and diaphragm 48. Load spring 50 and interface 54 may be disposed in an ambient environment external to regulator chamber 46 during operation of first pressure regulator 32. Interface 54 may include contact surface 61 facing diaphragm 48 for contacting diaphragm 48. Interface 54 may be made of a metallic material such as steel. In some embodiments, interface 54 may be made of a non-metallic material. Interface 54 may define second orifice 53 through contact surface 61. Second orifice 53 may be in fluid communication with first orifice 51 to define relief port 49 for venting an interior of regulator chamber 46 to the ambient environment external to regulator chamber 46. Interface 54 may be part of a retainer of load spring 50 that defines a cup-shaped cavity for receiving load spring 50. Contact surface 61 may be an external surface of the retainer opposite the cup-shaped cavity that engages with diaphragm 48.

Valve member 56 may be configured to regulate a flow of fluid through inlet port 59 of regulator chamber 46 and also to regulate a flow of fluid through relief port 49 during operation of first pressure regulator 32. Valve member 56 may be a movable shuttle that is configured to define a poppet valve arrangement with relief port 49 and also another poppet valve arrangement with inlet port 59.

First pressure regulator 32 may include return spring 58 that is coupled to valve member 56. Valve member 56 may be adjustable along arrow S (shown in FIG. 4A) as a function of a pressure in regulator chamber 46. Valve member 56 may be adjusted to open/close relief port 49 based on the pressure in regulator chamber 46. Similarly, valve member 56 may be adjusted based on the pressure in regulator chamber 46 to open/close inlet port 59 that defines a fluid passage between inlet chamber 47 and regulator chamber 46.

FIG. 4A shows a cross-sectional view of first pressure regulator 32 at first operating condition C1 when a pressure within regulator chamber 46 is lower than a desired regulated pressure required to cause a desired positional adjustment of bleed air valve 28. In this situation, load spring 50 may urge diaphragm 48 inwardly into regulated chamber 46 which in turn urges valve member 56 to open inlet port 59 to permit fluid flow from inlet chamber 47 to regulator chamber 46 to cause an increase in regulated pressure at outlet port 52. Valve member 56 may close first orifice 51 to prevent the release of fluid from relief port 49 defined by first orifice 51 and second orifice 53. The fluid entering regulator chamber 46 may be delivered toward actuator 30 via outlet port 52.

In this configuration, the region of diaphragm 48 around first orifice 51 may be spaced apart from a corresponding region of contact surface 61 of interface 54. Accordingly, contact between interface 54 and diaphragm 48 may occur along a relatively sharp circular outer edge 60 (sharp corner) of interface 54 that may contact diaphragm 48 and may exert a force on diaphragm 48. In this configuration, the contact area between interface 54 and diaphragm 48 may be relatively small and may result in a relatively high concentration of contact force on diaphragm 48. The cyclic nature of operation of first pressure regulator 32 may result in cyclic loading of diaphragm 48 along that relatively small contact area and may, over time, cause local plastic/permanent deformation of diaphragm 48 along that contact area. Such local plastic deformation of diaphragm 48 may alter the operating (e.g., elastic deformation, flexing) behaviour of diaphragm 48 and require diaphragm 48 or entire regulator 32 to be replaced.

FIG. 4B shows a cross-sectional view of first pressure regulator 32 at second operating condition C2 when the pressure within regulator chamber 46 is higher than a desired regulated pressure required to cause a desired positional adjustment of bleed air valve 28. This may occur when a pressure downstream of bleed air valve 28 (see FIG. 3) is higher than desired. Actuator 30 may be adjusted (via feedback duct 40) by a rise in pressure downstream of bleed air valve 28 to cause piston 42 to be pushed toward chamber A. This increase in pressure in chamber A may cause fluid to be forced back into regulator chamber 46 via outlet duct 35. As a pressure within regulator chamber 46 is increased, diaphragm 48 may push against interface 54 causing compression of load spring 50. The compression of load spring 50 may cause interface 54 and diaphragm 48 to become separated from valve member 56 thereby opening relief port 49 defined by first orifice 51 and second orifice 53. First orifice 51 may be substantially coaxial with second orifice 53. In this situation, fluid within regulator chamber 46 may be vented via relief port 49. Valve member 56 may be configured to close inlet port 59 to prevent fluid from entering regulator chamber 46. In this situation, all or most of contact surface 61 may be in contact with diaphragm 48.

FIG. 4C shows a cross-sectional view of first pressure regulator 32 when the pressure within regulator chamber 46 is equal or close to being equal to a desired regulated pressure. This may occur when (and shortly after) flow $W_r$ (shown in FIG. 4A-4B) through outlet port 52 changes direction. This may occur when first pressure regulator 32 is transitioning from first operating condition C1 to second operating condition C2 or from second operating condition C2 to first operating condition C1. In both situations, valve member 56 may be configured to close relief port 49 and prevent fluid from flowing into regulator chamber 46 and through relief port 49.

In some cases, plastic deformation of diaphragm 48 caused by edge 60 repeatedly pushing against diaphragm 48 may affect the flexing behaviour of diaphragm 48 and may cause a delayed response of diaphragm 48 during the transition from first operating condition C1 to second operating condition C2 and/or the transition from second operating condition C2 to first operating condition C1. In other words, the flexing behaviour diaphragm 48 may be discontinuous (i.e., out of synchronization) with the movement of interface 54 so that diaphragm 48 may suddenly jump between the intermediate condition of FIG. 4C and the condition C2 of FIG. 4B thereby also causing a step change (increase or decrease) in the pressure at outlet port 52. In some cases, when flow $W_r$ through outlet port 52 changes direction, valve member 56 may simultaneously close inlet port 59 and relief port 49 for a short period of time thereby delaying the transition from the intermediate condition C3 to first operating condition C1 or second operating condition C2. If the transition is delayed, a pressure within regulator chamber 46 after the transition may be different than a pressure within regulator chamber 46 if there was no simultaneous closing of inlet port 59 and relief port 49. The delay may cause a step change in the pressure at outlet port 52. The intermediate condition of FIG. 4C may be an unstable condition for diaphragm 48, which may result in diaphragm 48 rapidly oscillating between the configurations of FIGS. 4B and 4C and thereby causing oscillations of bleed air valve 28 between open and closed positions. In some situations, such oscillations could potentially substantially match a natural frequency of system 26 and develop a standing wave in the audible range and be a source of noise inside aircraft engine 10.

FIG. 5A illustrates two dimensional graph 62 showing the regulated pressure $P_r$ (i.e., pressure in regulator chamber 46) provided by an ideal pressure regulator as a function of a rate of flow $W_r$ (see FIGS. 4A-4C). As depicted, an ideal pressure regulator would provide a fixed regulated pressure $P_r$ for all rates of flow $W_r$.

FIG. 5B illustrates two dimensional graph 64 showing the regulated pressure $P_r$ as a function of rate of flow $W_r$. Two dimensional graph 64 may include region 66, dead band region 68 (discontinuity) and region 70. FIG. 4A shows first pressure regulator 32 when flow $W_r$ and regulated pressure $P_r$ is within region 66 (i.e. first operating condition C1). FIG. 4B shows first pressure regulator 32 when flow $W_r$ and regulated pressure $P_r$ is within region 70 (i.e. second operating condition C2). As illustrated, dead band region 68 may define a sudden change in pressure within regulator chamber 46. The sudden change in pressure within regulator chamber 46 may be accompanied by a change in direction of flow $W_r$ with respect to regulator chamber 46 when changing from first operating condition C1 to second operating condition C2 or from second operating condition C2 to first operating condition C1.

Figure 6A:
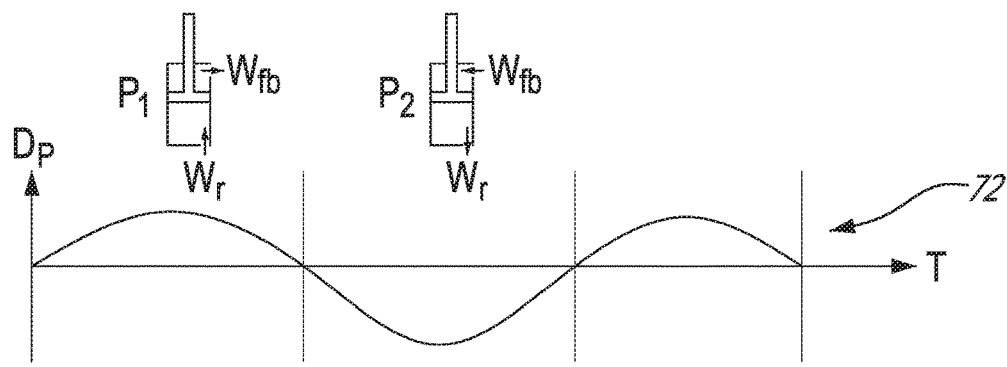
FIG. 6A is a two-dimensional graph showing a displacement of an actuator piston of the system of FIG. 3 inside a cylinder as a function of time.

FIG. 6A illustrates two-dimensional graph 72 showing piston displacement $D_p$ of piston 42 as a function of time. As depicted in FIG. 6A, piston 42 and connecting rod 41 may be displaced within cylinder 43 to move between first position and second position in a sinusoidal fashion to regulate pressure $P_{DS}$ downstream of bleed air valve 28. In reference to FIG. 3, fluid flow from regulator chamber 46 to chamber A may cause upward movement of piston 42 to cause bleed air valve 28 to open and fluid flow from chamber A to regulator chamber 46 may cause downward movement of piston 42 to cause bleed air valve 28 to close.

Figure 6B:
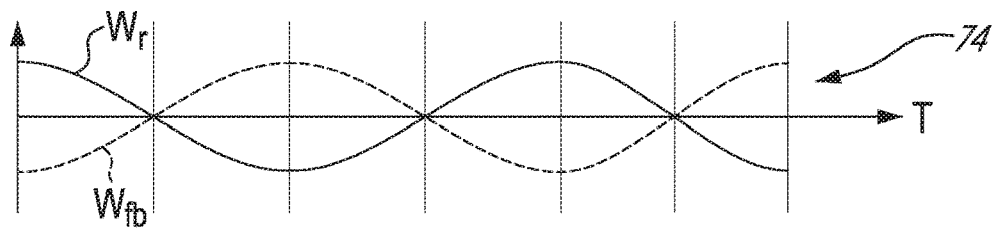
FIG. 6B is a two-dimensional graph showing a reference flow rate to a first side of the actuator piston and feedback flow rate to a second side of the piston as a function of time.

FIG. 6B illustrates two-dimensional graph 74 showing a rate of fluid flow $W_r$ and a rate of feedback flow $W_{fb}$ (see FIG. 3 also) as a function of time. As depicted, flow $W_r$ may be shifted from feedback flow $W_{fb}$ by a half a period of time T such that when fluid flow $W_r$ is from regulator chamber 46 to chamber A, feedback flow $W_{fb}$ is from chamber B to main bleed air duct 22. Also, when fluid flow $W_r$ is from chamber A to regulator chamber 46, feedback flow $W_{fb}$ is from main bleed air duct 22 to chamber B.

Figure 6C:
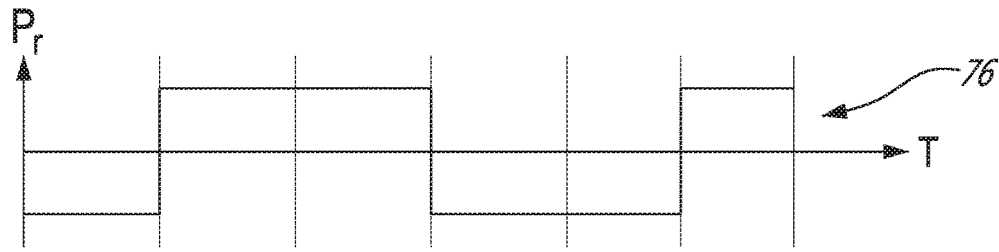
FIG. 6C is a two-dimensional graph showing a reference pressure provided by the first pressure regulator on the first side of the actuator piston as a function of time.

FIG. 6C illustrates two-dimensional graph 76 showing pressure $P_r$ at chamber A (or regulator chamber 46 as a function of time. As depicted, regulated pressure $P_r$ may suddenly change when diaphragm 48 of first pressure regulator 32 jumps from one condition to another corresponding to when fluid flow $W_r$ changes direction.

Figure 6D:
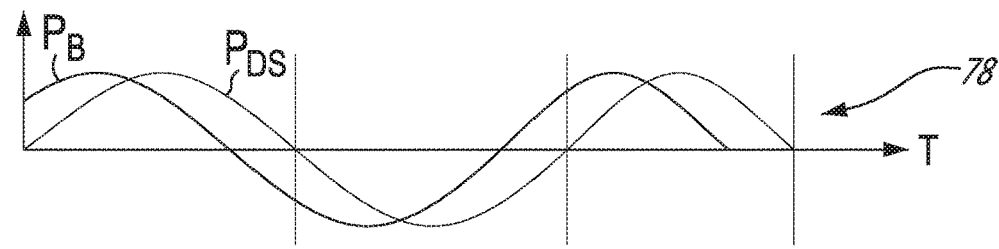
FIG. 6D is a two-dimensional graph showing a pressure on the second side of the actuator piston and a pressure downstream of a bleed air valve of the system of FIG. 3 as a function of time.

FIG. 6D illustrates two-dimensional graph 78 showing pressure $P_B$ at chamber B and pressure $P_{DS}$ downstream of bleed air valve 28 as a function of time. As depicted in FIG. 6D, pressure $P_B$ within chamber B may change in a sinusoidal fashion based on a position of piston 42 and connecting rod 41. Pressure $P_B$ may be at a maximum when flow $W_r$ is positive and decreasing and feedback flow $W_{fb}$ is negative and increasing. Pressure $P_B$ may be at a minimum when flow $W_r$ is at a minimum and feedback flow $W_{fb}$ is at a maximum. It is further shown in FIG. 6D that a pressure $P_{Ds}$ downstream from bleed air valve 28 may be shifted from (e.g., lag) pressure $P_B$. Chamber B may be in fluid communication with main bleed air duct 22 at a location downstream from bleed air valve 28. However, there may be a delay (response time) when transferring fluid between chamber B and main bleed air duct 22 resulting in the phase shift between $P_A$ and $P_{DS}$ illustrated in FIG. 6D.

Figure 6E:
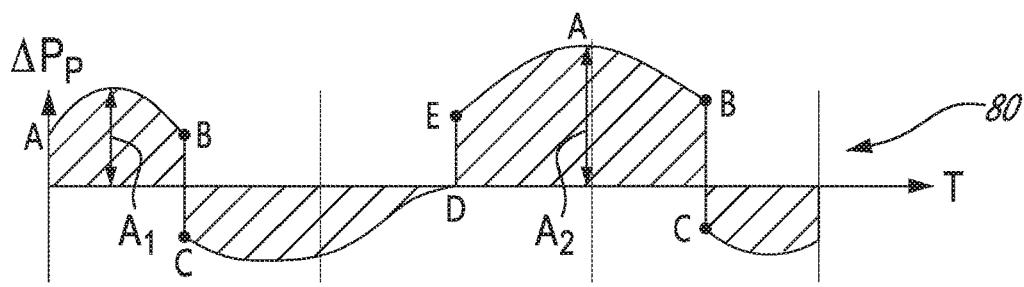
FIG. 6E is a two-dimensional graph showing an exemplary pressure differential $\Delta P_P$ across the actuator piston as a function of time.

FIG. 6E illustrates two-dimensional graph 80 showing pressure differential $\Delta P_P$ between chamber B and chamber A of actuator 30 as a function of time. As depicted, pressure differential $\Delta P_P$ may jump when flow $W_r$ changes direction. As depicted, amplitude A2 may be greater than amplitude A1 after a period of time T. The increase in amplitude may be caused by vibration of diaphragm 48. Diaphragm 48 may begin vibrating as explained above and cause the sudden changes in pressure between points B and C and between points D and E. In some situations, the vibration of diaphragm 48 may be amplify when vibrating at a resonant frequency associated with system 26.

Figure 7:
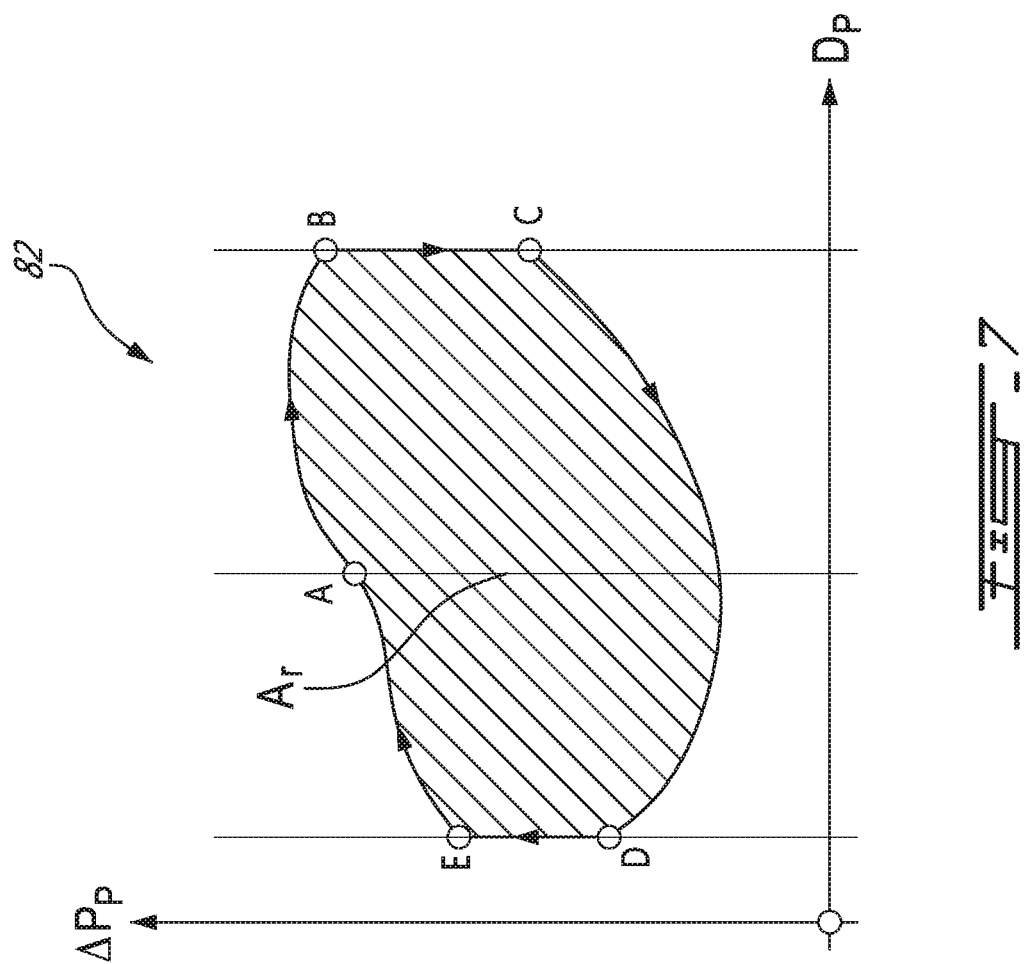
FIG. 7 is a two-dimensional graph showing the pressure differential $\Delta P_P$ across the actuator piston as a function of piston displacement $D_P$.

FIG. 7 illustrates two-dimensional graph 82 showing pressure differential $\Delta P_P$ between chamber B and chamber A of actuator 30 as a function of piston displacement $D_p$. Area $A_r$ within two-dimensional graph 82 equals the positive mechanical work added into system 26 by the modulation of pressure using first pressure regulator 32 when diaphragm 48 is suddenly jumping from one configuration to another. The magnitude of the sudden pressure changes may increases area $A_r$ sufficiently to exceed the energy dissipated by internal friction thus pushing diaphragm 48 to sustained oscillations instead of damped oscillations. This may result in sustained vibration of diaphragm 48 in some situations.

FIGS. 8A-8B show schematic cross-sectional views of second pressure regulator 132 which may form part of system 26. In some situations, second pressure regulator 132 may provide an improved performance of system 26 compared to first pressure regulator 32, as explained below. Second pressure regulator 132 may be a single stage pressure regulator. In reference to the above description of first pressure regulator 32, some elements of second pressure regulator 132 are common to first pressure regulator 32 and like elements have been indicated using like reference characters. FIG. 8A shows second pressure regulator 132 in a first operating condition C1 where fluid flow $W_r$ is delivered from regulator chamber 46 out of outlet port 52. FIG. 8B shows second pressure regulator 132 in a second operating condition C2 where fluid flow $W_r$ is received into regulator chamber 46 via outlet port 52 and is then vented to the ambient environment external to regulator chamber 46 via relief port 49. As explained below, second pressure regulator 132 may be less susceptible to exhibiting the unstable intermediate condition C3 of first pressure regulator 32 shown in FIG. 4C.

Second pressure regulator 132 may include interface 84 operatively disposed between load spring 50 and diaphragm 48. Interface 84 may include contact surface 86 for engaging with diaphragm 48. Interface 84 may be part of a retainer of load spring 50 that defines a cup-shaped cavity for receiving an end of load spring 50 of any suitable type. Interface 84 may be made of a suitable metallic material. Load spring 50 may be a coil spring having a generally cylindrical shape and interface 84 may have a circular cross-sectional profile transverse to a longitudinal axis of load spring 50. Interface 84 may be made of a metallic material such as steel. In some embodiments, interface 84 may be made of a non-metallic material.

Contact surface 86 may be an external surface of interface 84 opposite the cup-shaped cavity that engages with diaphragm 48. Contact surface 86 of interface 84 may be convex toward diaphragm 48. Contact surface 86 may have a circular periphery and second orifice 53 may be disposed centrally of contact surface 86 at apex 88 of contact surface 86. Contact surface 86 may be dome-shaped and/or rounded to present no sharp edges that may engage with, dig into and/or eventually cause local deformation of diaphragm 48 as in the case of first pressure regulator 32. Contact surface 86 may provide a larger surface area for engaging with diaphragm 48. In some embodiments, contact surface 86 may have a profile shaped based on an expected deformation of diaphragm 48 in accordance with the Kirchhoff-Love theory of thin plates. In some embodiments, contact surface 86 may have a spherical or paraboloid profile. In some embodiments, an aspect ratio of contact surface 86 may be selected to provide a desired gain (i.e., change in pressure versus change in flow $W_r$) of second pressure regulator 132.

In some embodiments, the sudden changes in pressure exhibited within regulator chamber 46 of first pressure regulator 32 when fluid flow $W_r$ changes direction may not be exhibited in chamber 46 of second pressure regulator 132. Second pressure regulator 132 may exhibit a relatively smooth change in pressure within regulator chamber 46 when fluid flow $W_r$ changes direction. This smooth change in pressure may be partly attributed to contact surface 86 of interface 84 that engages diaphragm 48 and continuously maintains contact with diaphragm 48 during the transition between first operating condition C1 and second operating condition C2. Contact surface 86 may be shaped to enable apex 88 of contact surface 86 to maintain contact with diaphragm 48 throughout operation of second pressure regulator 132. Engagement of interface 84 with diaphragm 48 may reduce the likelihood of local plastic deformation being caused to diaphragm 48 and consequently may improve the operation of second pressure regulator 132 and potentially extend the life of diaphragm 48.

Due at least in part to their different configurations, first pressure regulator 32 and second pressure regulator 132 may have different transfer functions (i.e., responses based on pressure conditions). For example, the geometric differences between interface 54 of first pressure regulator 32 and interface 84 of second pressure regulator 132 may contribute to such differences in transfer functions.

FIG. 8A shows a cross-sectional view of second pressure regulator 132 at first operating condition C1 when the pressure within chamber 46 is lower than the desired regulated pressure required to adjust bleed air valve 28. In contrast with first pressure regulator 32 (see FIG. 4A), when second pressure regulator 132 is operating under first operating condition C1, contact surface 86 provides a relatively large contact area A1 that engages diaphragm 48 as opposed to only a circular sharp edge. Apex 88 of contact surface 86 may be in contact with diaphragm 48 when second pressure regulator 132 is in first operating condition C1. The periphery of first orifice 51 may be in contact with the periphery second orifice 53. First orifice 51 may be coaxial with second orifice 153.

FIG. 8B shows a cross-sectional view of second pressure regulator 132 at second operating condition C2 when the pressure within chamber 46 is higher than the desired regulated pressure required to adjust bleed air valve 28. In contrast with first pressure regulator 32 (see FIG. 4B), when second pressure regulator 132 is operating under second operating condition C2, there may be less engagement between diaphragm 48 and contact surface 86 (e.g., see area A2). Apex 88 of contact surface 86 may be in contact with diaphragm 48 when second pressure regulator 132 is in second operating condition C2. The periphery of first orifice 51 may be in contact with the periphery of second orifice 53. First orifice 51 may be coaxial with second orifice 53. First orifice 51 and second orifice 53 may be circular.

When second pressure regulator 132 is transitioning from first operating condition C1 to second operating condition C2, an amount of contact area between diaphragm 148 and contact surface 86 may be gradually decreased. When second pressure regulator 132 is transitioning from second operating condition C2 to first operating condition C1, an amount of contact between diaphragm 48 and contact surface 86 may be gradually increased. Unlike first pressure regulator 32, there may be no simultaneous closing of relief port 49 and of inlet port 59 in second pressure regulator 132 so that dead band region 68 (discontinuity) shown in FIG. 5B may not be exhibited by second pressure regulator 132.

FIG. 9 is a flowchart of an exemplary method 90 for operating a pressure regulator (e.g. second pressure regulator 132). It is understood that aspects of method 90 can be combined with other steps/actions described herein and/or other aspects of first pressure regulator 32 or second pressure regulator 132. In various embodiments, method 90 includes:

in a first operating condition C1 of second pressure regulator 132:
    delivering delivery fluid from regulator chamber 46 via outlet port 52; and
    engaging contact surface 86 of interface 84 with diaphragm 48 over first area A1 of a first size; (see block 92)
in a second operating condition C2 of second pressure regulator 132:
    receiving return fluid into regulator chamber 46 via outlet port 52;
    venting the return fluid from regulator chamber 46 to an ambient environment external to regulator chamber 46 via relief port 49; and
    engaging contact surface 86 of interface 84 with diaphragm 48 over second area A2 of a second size smaller than the first size (see block 94).

In some embodiments of method 90, contact surface 86 is convex toward diaphragm 48. First area A1 may include apex 88 of contact surface 86. Second area A2 may include apex 88 of contact surface 86.

In some embodiments, method 90 may include elastically deforming diaphragm 48 between a first configuration corresponding to first operating condition C1 and a second configuration corresponding to second operating condition C2. Method 90 may include maintaining contact between a periphery of first orifice 51 defined in diaphragm 48 and contact surface 86 throughout a transition between first operating condition C1 and second operating condition C2.

In some embodiments, method 90 may include using contact surface 86 to cause diaphragm 48 to deform according to the Kirchhoff-Love theory of plates.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the pressure regulators and methods are described in relation to a system for controlling a bleed air valve in an aircraft engine but it is understood that the pressure regulators and methods described herein may be used in other types of systems. Yet further modifications could be implemented by a person of ordinary skill in the art in view of the present disclosure, which modifications would be within the scope of the present technology.

What is claimed is:

1. A pressure regulator comprising:
    a chamber having:
        an inlet port for receiving a fluid;
        an outlet port for delivering the fluid;
        a relief port for venting an interior of the chamber to an ambient environment external to the chamber; and
        a diaphragm having a first orifice therethrough, a face of the diaphragm surrounding and adjoining the first orifice defining at least part of the chamber;
    a first spring configured to interact with the diaphragm;
    an interface operatively disposed between the first spring and the diaphragm, the interface including a contact surface for contacting the diaphragm, the contact surface being convex toward the diaphragm, the interface defining a second orifice therethrough that is in fluid communication with the first orifice in the diaphragm, the second orifice being disposed centrally of the contact surface and at an apex of the contact surface, the first and second orifices defining the relief port; and
    a valve member operatively coupled to a second spring and configured to:
        regulate a flow of the fluid through the inlet port; and
        regulate a flow of the fluid through the relief port,
    wherein, a most radially inward location on the face of the diaphragm at a radial location of the apex of the contact surface is exposed to the fluid in the chamber.

2. The pressure regulator of claim 1, wherein:
    the interface is part of a retainer defining a cup-shaped cavity for receiving the first spring; and
    the contact surface is an external surface of the retainer opposite the cup-shaped cavity.

3. The pressure regulator of claim 1, wherein the contact surface is dome-shaped.

4. The pressure regulator of claim 1, wherein the contact surface has a circular periphery.

5. The pressure regulator of claim 1, wherein the first spring is disposed externally to the chamber and the diaphragm is disposed between the first spring and the valve member.

6. The pressure regulator of claim 1, wherein the contact surface is shaped based on an expected deformation of the diaphragm according to the Kirchhoff-Love theory of plates.

7. The pressure regulator of claim 1, wherein:
    a first portion of the valve member is configured to regulate the flow of the fluid through the relief port from the chamber;
    the first portion of the valve member is disposed inside of the chamber;
    a second portion of the valve member extends through the inlet port;
    the inlet port and the second portion of the valve member cooperatively define a passage for receiving the fluid into the chamber; and
    the passage is external of the valve member.

8. The pressure regulator of claim 1, wherein:
    the chamber defines a passage providing fluid communication from the inlet port to the relief port; and
    the passage is external of the valve member.

9. A system for controlling bleed air flow in an aircraft engine, the system comprising:
- a bleed air duct for receiving bleed air from a compressor section of the aircraft engine;
- a bleed air valve configured to control a flow of the bleed air through the bleed air duct;
- a pressure regulator including:
  - a chamber having:
    - an inlet port for receiving a portion of the bleed air;
    - an outlet port for delivering the portion of the bleed air;
    - a relief port for venting an interior of the chamber to an ambient environment external to the chamber; and
    - a diaphragm having a first orifice therethrough partially defining the relief port, a face of the diaphragm surrounding and adjoining the first orifice defining at least part of the chamber;
  - a first spring operatively engaged with the diaphragm;
  - an interface operatively disposed between the first spring and the diaphragm, the interface including a contact surface contacting the diaphragm, the contact surface being convex toward the diaphragm, the interface defining a second orifice therethrough that is in fluid communication with the first orifice in the diaphragm, the second orifice being disposed centrally of the contact surface and at an apex of the contact surface, the first and second orifices defining the relief port; and
  - a valve member operatively coupled to a second spring and configured to:
    - regulate a flow of the portion of the bleed air through the inlet port; and
    - regulate a flow of the portion of the bleed air through the relief port; and
  - an actuator operatively coupled to the bleed air valve for controlling the bleed air valve, the actuator actuatable based on the portion of the bleed air delivered at the outlet port,
- wherein, a most radially inward location on the face of the diaphragm at a radial location of the apex of the contact surface is exposed to the fluid in the chamber.

10. The system of claim 9, wherein:
- the interface is part of a retainer defining a cup-shaped cavity for receiving the first spring; and
- the contact surface is an external surface of the retainer opposite the cup-shaped cavity.

11. The system of claim 9, wherein the contact surface has a circular periphery and the second orifice is disposed centrally on the contact surface.

12. The system of claim 9, wherein the contact surface is shaped based on an expected deformation of the diaphragm according to the Kirchhoff-Love theory of plates.

13. The system of claim 9, wherein the first spring is engaged with an exterior side of the diaphragm opposite the chamber.

\* \* \* \* \*